Feb. 3, 1970   W. C. JOHNSON   3,493,713
ELECTRIC ARC OVERLAY WELDING
Filed Feb. 20, 1967                                  4 Sheets-Sheet 1
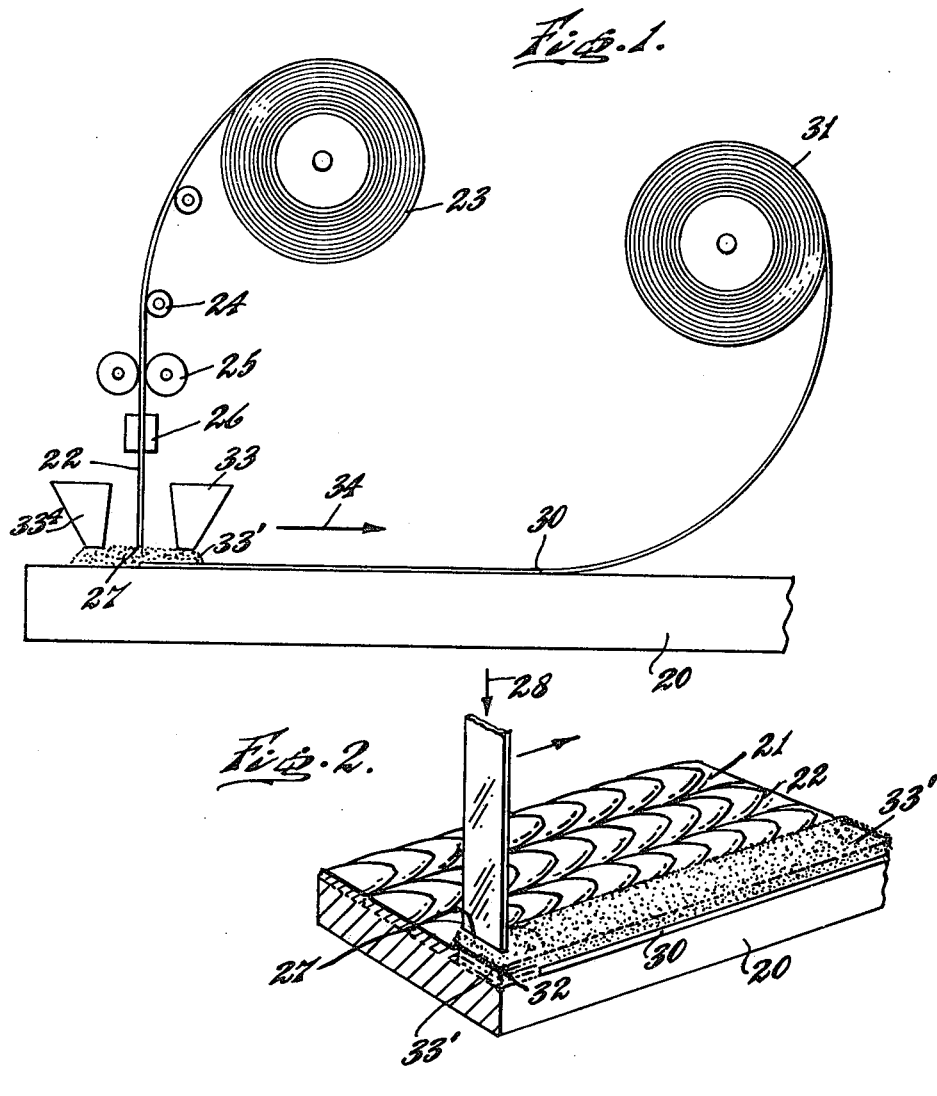
INVENTOR.
Wallace C. Johnson
BY
ATTORNEYS Feb. 3, 1970  W. C. JOHNSON  3,493,713
ELECTRIC ARC OVERLAY WELDING
Filed Feb. 20, 1967  4 Sheets-Sheet 2
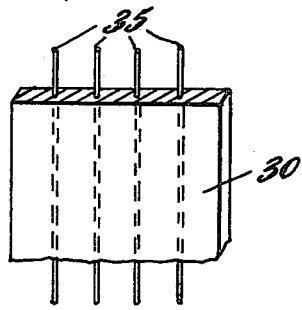
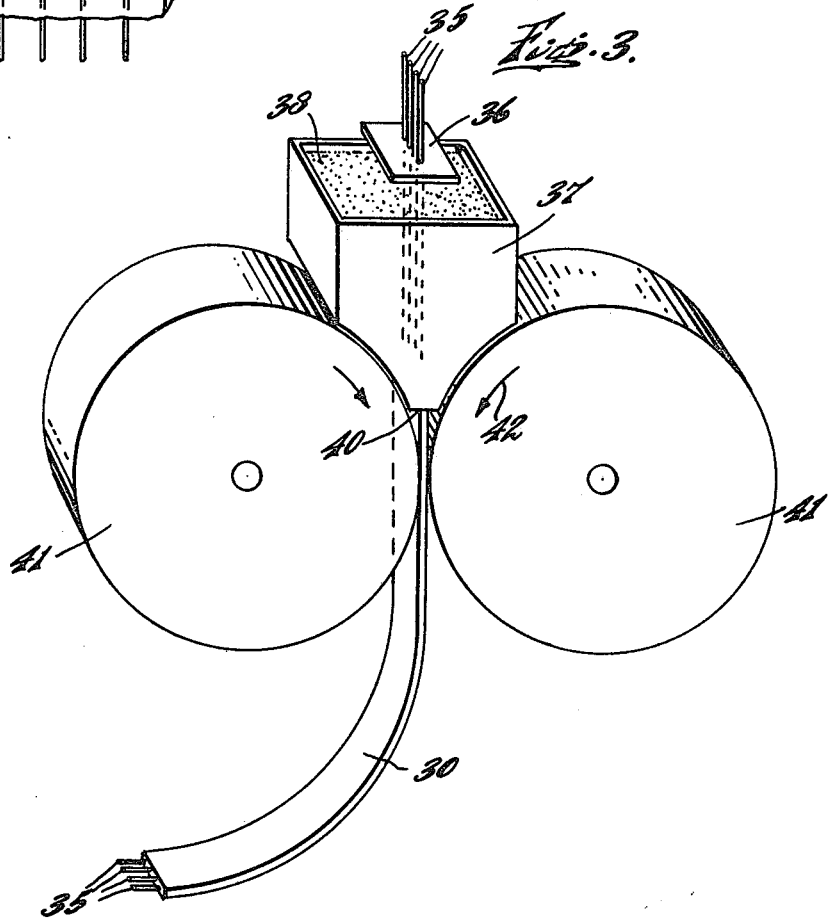
INVENTOR.
Wallace C. Johnson
BY
ATTORNEYS

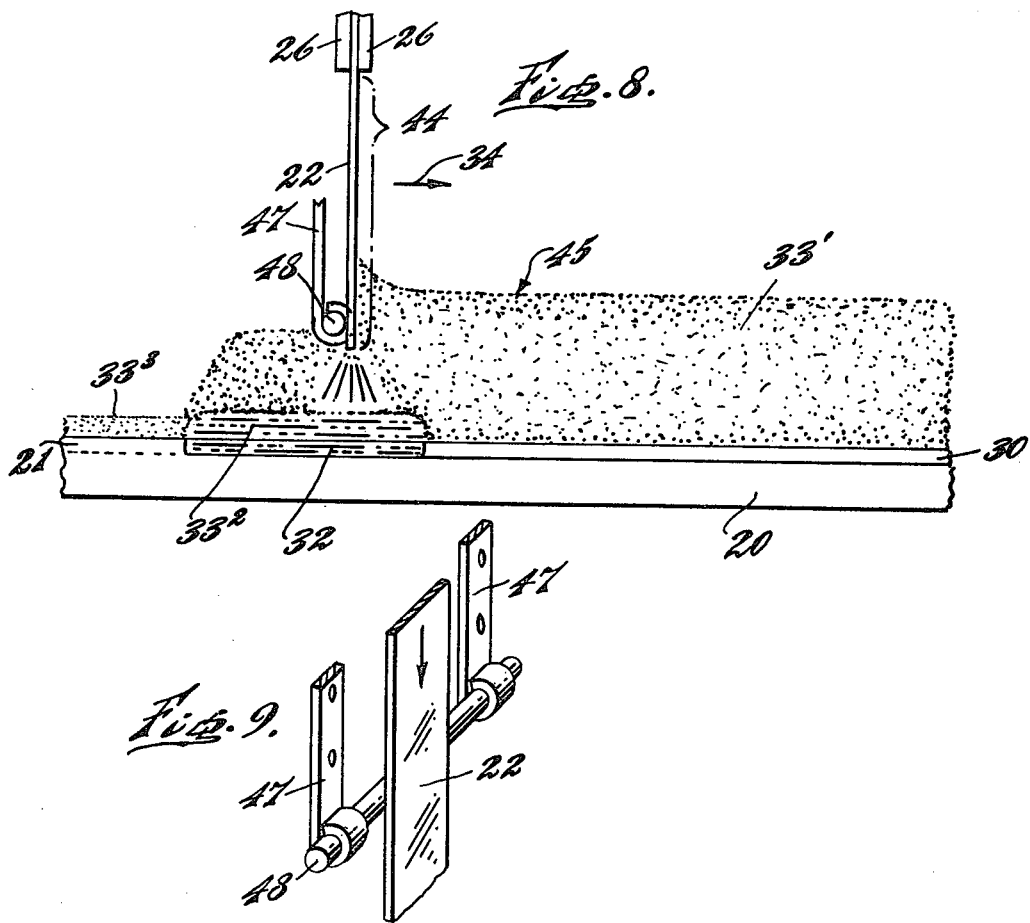

United States Patent Office 3,493,713
Patented Feb. 3, 1970

3,493,713
ELECTRIC ARC OVERLAY WELDING
Wallace C. Johnson, St. Davids, Pa., assignor to Arcos Corporation, Philadelphia, Pa., a corporation of Pennsylvania
Filed Feb. 20, 1967, Ser. No. 617,239
Int. Cl. B23k 9/04, 9/18, 9/00
U.S. Cl. 219—76        7 Claims

ABSTRACT OF THE DISCLOSURE

The invention relates to electric arc overlay welding, often called arc-cladding, on a metallic backing which in many cases will be a steel backing. A barrier strip rests on the backing and a strip electrode spaced from the backing arcs to the barrier strip. In one form the barrier strip is a green or unsintered strip of metal powder having fibers therein. The powder metallurgy barrier strip in many cases will include deoxidizers which will aid in parting the slag from the overlay weld. In some cases the barrier strip will have an open porosity in the range of 5 to 45% by volume filled with an oxidizing gas which aids in lowering the carbon content of the overlay weld. In other cases the powder metal strip electrode or the barrier strip will include an oxide such as an iron oxide to reduce the carbon pickup. In some cases a deoxidizer will also be included in a powder metal strip electrode. The strip electrode may be a green or unsintered strip of metal powder held together with plastic fibers such as nylon or polyfluorocarbon. The strip electrode is used with extended "stickout" in the preferred embodiment, and it is then supported behind its lower end as it plows through the submerging flux.

DESCRIPTION OF THE INVENTION

The present invention relates to electric arc overlay welding, often called arc-cladding, on a metallic backing.

A purpose of the invention is to assure close conformity of a barrier strip with the backing by making the barrier strip of green or unsintered powder metal having fibers therein, the fibers preferably being metallic wires extending longitudinally.

A further purpose is to employ a green or unsintered strip electrode of metal powder held together with elongated fibers of nonmetallic plastic such as nylon or polyfluorocarbon.

A further purpose is to aid in parting the slag from the overlay weld by including a deoxidizer in adequate quantity in the powder metal barrier strip, in the powder metal strip electrode or in both the barrier strip and the strip electrode.

A further purpose is to introduce the deoxidizer as discrete particles in which form it is most effective, and not as an alloy with iron, chromium, nickel or the like.

A further purpose is to aid in lowering the carbon content of the overlay weld particularly by eliminating carbon picked up from a high carbon steel backing, by employing a barrier strip having an open porosity of 5 to 45%, preferably 10 to 30% filled with an oxidizing gas such as air.

A further purpose is to lower the carbon pickup by including a metallic oxide such as oxide of iron, oxide of chromium or oxide of nickel in the composition of the powder metal electrode, the powder metal barrier strip or both.

A further purpose is to use an extended "stickout" of the strip electrode, causing it to heat to redness and to bolster the strip at the lower end against the bending force imparted by plowing through the submerged arc flux preferably by a ceramic rod.

A further purpose is to produce sound overlays, free from cracks and inclusions, and with low dilution.

Further purposes appear in the specification and in the claims.

The drawings illustrate a few only of the numerous embodiments in which the invention may appear, selecting the forms shown from the standpoints of convenience in illustration, satisfactory operation and clear demonstration of the principles involved.

FIGURE 1 is a diagrammatic elevation of mechanism for overlay welding according to the invention.

FIGURE 2 is a fragmentary perspective to enlarged scale showing the making of an overlay weld according to the invention.

FIGURE 3 is a diagrammatic perspective showing the forming of a barrier strip or strip electrode according to one embodiment of the invention.

FIGURE 4 is a fragmentary perspective of the barrier strip of FIGURE 3.

FIGURE 5 is a diagrammatic plan view of a modified form of barrier strip according to the invention.

FIGURE 8 is a diagrammatic vertical section of an overlay weld showing support of the "stickout" of the highly heated strip electrode at the lower end.

FIGURE 9 is a fragmentary perspective of the structure of FIGURE 8.

Figure 6:
FIGURE 6 is a photomacrograph of an overlay weld bead useful in explaining the invention.

In the prior art of overlay welding, green or sintered powder metal electrodes and barrier strips have been proposed in FIGURE 3 of my U.S. Patent 3,271,554, granted Sept. 6, 1966, for Overlay Welding. The paper by Nerodenko and Frumin appearing in 9 Avtomaticheskaya Svarka 31 (September 1964), and translated by BWRA refers to Powder Metallurgy Strip Electrodes for Overlay Welding.

In the program of experimental work using powder metallurgy strip electrodes and powder metallurgy barrier strips for overlay welding, a number of practical difficulties have been observed which have proved to be hard to overcome.

Where the barrier strip and/or the strip electrode are of green powder metal, which has been compacted but not sintered, the strip is relatively weak, and prone to crack or break, interrupting operation.

Where a green unreinforced powder metal strip electrode has been used with considerable "stickout," there has been a tendency for the electrode to simply break off in increments and deposit short sections of unmelted electrode in the weld pool, leading to discontinuity in welding. When a green unreinforced powder metal strip is used as an electrode, it must be remembered that not only is it weakened by the $RI^2$ heating in the "stickout" portion, but it must push through a fairly thick deposit of flux, which is often of the order of 2 inches deep in submerged arc welding.

Where thick sintered powder metal strip has been used as the barrier strip, and also where conventional wrought solid strip has been so used, particularly where the metallic backing is not absolutely straight, as in a tank or shell, there has been a tendency for the barrier strip not to conform to the metallic backing, sometimes resulting in poor bond between the overlay and the metallic backing. Even where the metallic backing is a flat plate, it is sometimes difficult to straighten a stiff sintered powder metal barrier strip so that it will lie perfectly flat under the arc.

Where the backing is steel and especially where there is a substantial carbon content in the backing steel, and a considerable dilution of the overlay by the backing results, it is difficult to maintain an adequately low carbon content in a one layer overlay weld. This is particularly a problem in corrosion resistant alloys such as alloys of the stainless steel type in which excessive carbon content interferes seriously with corrosion resistance.

Finally, once the overlay weld is finished, the problem remains of removing the slag.

Where solid wrought strip electrodes and barrier strips have been used, slag removal with proper flux compositions has been easy. But with powder metal strip electrodes and/or barrier strips, slag removal from the flat weld bead surface is a considerable problem, requiring labor in the form of pounding, ginding or chipping.

The present inventor has undertaken experiments to solve these problems. These experiments during a year of work at first achieved limited success.

The inventor particularly has conducted a series of experiments in an effort to improve the construction of the electrode. An attempt was made to manufacture electrode strips which included glass fibers embedded in metallic powders which were compacted and elongated and used in green form (unsintered). This was found to be impractical because the glass fibers ruptured in elongation for example under 40 tons per square inch rolling pressure, and the strip was not strong enough to support itself.

Then an attempt was made to produce strip electrode by embedding aluminum wires in metallic powder having the composition desired for the overlay, the strip being compacted and elongated and used green. These experiments failed as the aluminum wire was incapable of withstanding the high compressive forces and fractured.

An attempt was then made to produce a strip electrode which had stainless steel wires embedded in metallic powder which was compacted and elongated and used in green form. Experiments were also conducted with such strip which was sintered in a reducing gas such as hydrogen or cracked ammonia, and at lower temperatures or for shorter times than would be suitable without the internal fibers or wires.

The resulting green strip and the resulting sintered strip were strong and coherent but when an attempt was made to use them as an electrode, an unexpected effect occurred. The stainless steel wires exploded and disrupted the strip electrode. This is believed to occur because the stainless steel wires had much higher conductivity than the compressed alloy metal powders such as chromium, nickel and iron and therefore there was a distinct tendency for the high welding current to flow through the stainless steel wires, raising them to a very high temperature at which they vaporized and caused the resultant explosion within the green strip.

Experiments indicate, however, that green or unsintered powder metallurgy strip used as a strip electrode can be strengthened by including, buried in the strip, longitudinally extending fibers of a nonmetallic or organic plastic such as nylon (linear polyamide) or a polyfluorocarbon such as polytetrafluoroethylene (Teflon), the copolymer of tetrafluoroethylene with 5 to 35% by weight of hexafluoropropylene (Teflon-FEP) or monochlorotrifluoroethylene (Kel-F). It is important to run the electrode with adequate "stickout" so that the organic plastic will distill off and not react with the weld pool. On the other hand, the plastic is capable of holding the integrity of the strip to a point very close to the point at which the strip will melt in the arc or in the pool.

An effort was then made to apply the knowledge gained by these experiments to making an improved barrier strip and especially one which was highly flexible and would as it uncoiled conform to a curved surface of a backing plate or to irregularities of a backing plate for the purpose of overlaying. In this connection barrier strips were made up which have stainless steel wires running longitudinally through them and are composed of compacted green (unsintered) alloy powders. It was found that these strips are very superior as barrier strips, since the current does not flow longtiudinally through them, and, therefore, there is no tendency to cause heating or an explosion of the stainless steel supporting wires.

It has been found that improved barrier strips can also be made by including other metallic fibrous materials extending longitudinally therein, instead of the stainless steel wires, an example being nickel fibers or iron fibers. A barrier strip of powder metal with longitudinally extending metallic fibers therein has been found to be very flexible and to lie flat when it is in the green or unsintered form without the need to straighten it after it is uncoiled. Moreover, this elimination of sintering saves about one-third of the total cost of preparing the strip.

Such barrier strip can be made in thicknesses in the range of 0.030 to 0.125 and preferably in the thickness range of 0.050 to 0.090 inch. The barrier strip can be effectively made in widths between ½ inch and 6 inches or greater and preferably between ¾ inch and 3 inches, a desirable width for many cases being about 1½ inches. These same dimensions are also suitable for a strip electrode when made from sintered powder.

The experiments have been extended to endeavor to simplify the removal of slag from welds using powder metal strip electrodes and/or barrier strips, so that peening, pounding, grinding and chipping can be avoided and the slag will be self-removing.

Experiments indicate that by including substantial quantities of deoxidizer in the powder metal barrier strip and preferably also in the powder metal electrode strip, it is possible to make any one of the usual submerged arc welding slags non-adhering by removing surface oxides. It would appear that air within the powder metallurgy strip tends to oxidize the surface of the weld metal so as to change its surface tension and cause the protective slag to cling tightly.

A typical flux composition which is adhering when powder metal strip electrodes and barrier strips are used unless special precautions are taken and which is enabled to part readily by inclusion of deoxidizer in the strip electrode, in the barrier strip and preferably in both, is as follows:

| | Percent |
|---|---|
| Calcium silicate | 30–60 |
| Mullite | 5–20 |
| Fluorspar | 2–10 |
| Cryolite | 0–10 |
| Zirconium silicate | 0–20 |

This flux is bonded by sodium silicate to agglomerate into desired particles and then dried.

The following table shows examples of specific flux compositions which can to great advantage be made to part from the weld bead by the presence of deoxidizers in the strip electrode or the barrier strip or both:

| | Neutral flux | Neutral flux | Chromium enriched fluxes | |
|---|---|---|---|---|
| Calcium silicate | 54 | 78 | 43 | |
| Mullite | 16 | 10 | 14 | 20 |
| Zirconium silicate | 16 | | 14 | |
| Fluorspar | 7 | 8 | 6 | 32 |
| Bentonite clay | 2 | 2 | 2 | 2 |
| Cryolite | 5 | | 4 | |
| Ferrochromium | | | 15 | 13 |
| Electrolytic manganese | | 2 | 2 | 3 |
| Alumina | | | | 30 |
| Total, percent | 100 | 100 | 100 | 100 |
| Sodium Silicate Binder | q. s. | q. s. | q. s. | q. s. |

While it will be evident that sound metallurgical principles should be followed to avoid excessive residual quantities of deoxidizer, it will be understood that with this limitation one or more of the following deoxidizers can be used in the following proportions by weight in the barrier strip and also desirably in the electrode:

| | Percent |
|---|---|
| Aluminum | 0.5–5.0 |
| Manganese | 0.5–6.0 |
| Calcium | 0.05–2.0 |
| Silicon | 0.25–2.0 |
| Titanium | 0.25–2.0 |
| Magnesium | 0.25–3.0 |
| Lanthanum | 0.10–0.6 |
| Cerium | 0.10–0.6 |
| Boron | 0.05–0.2 |
| Lithium | 0.20–0.5 |

Tests with powder metal electrode strips having no deoxidizer gave very adherent slags and a tendency to gas cavities. FIGURE 6 shows a photograph of an overlay weld bead of chormium-nickel steel which has this tightly adhering slag three months after welding, the flux composition in percentage by weight being:

| | Percent |
|---|---|
| Aluminum | 1.0 |
| Fluorspar | 6.2 |
| Cryolite | 4.1 |
| Ferrochrome | 15.5 |
| Bentonite | 2.1 |
| Zirconium silicate | 14.4 |
| Wollastonite | 42.3 |
| Mullite | 14.4 |

The flux particles were bonded with 18% on the weight of the flux of 41° Baumé sodium silicate in water, and dried to remove the water.

Figure 7:
FIGURE 7 is a photomacrograph of an overlay weld bead similar to FIGURE 6 for comparison purposes.

FIGURE 7 shows an overlay weld bead of chromium nickel steel of the same composition as that in FIGURE 6 and using the same flux, except that the powder metal electrode strip contains 1% of granular aluminum by weight, the slag in this case being self-removing within minutes after welding and the surface of the weld bead being silvery. It is evident from FIGURE 6 that the presence of aluminum or another deoxidizer in the flux alone is not sufficient to release the slag. It would have been sufficient, based on prior experience, were the electrode strip made of wrought steel, with or without a barrier strip of wrought steel. FIGURE 7 shows that aluminum or another deoxidizer within the powder metallurgy electrode strip does deoxidize the weld metal and leads to normal or superior slag removal.

While the results shown in FIGURE 7 are for a powder metal electrode strip containing 1% aluminum, using a submerged arc welding flux also containing this deoxidizer, similar results can be obtained by including the deoxidizer in a powder metal barrier strip or in a powder metal electrode and a barrier strip. It is preferred to include the deoxidizer in both the powder metal electrode and the barrier strip.

Experiments also have been carried on in an effort to cut down on the increase of carbon in the overlay from a base plate of steel such as carbon steel having a composition if, for example, as much as 0.30% carbon. It has been discovered that the presence of porosity in the powder metal barrier strip of between 5 and 45% by volume, preferably between 10 and 30% by volume, and the inclusion of an oxidizing gas such as air in the pores greatly lowers the carbon content. Without limiting to any theory, it seems that the pronounced effect in lowering the carbon content is due to the fact that the pores of the barrier strip contain air and introduce it under the fluv blanket deep in the weld pool where it can encounter the carbon and oxidize it. A solid metal strip cannot carry a gas into the arc. For example, conducting submerged arc overlay welding under the same conditions in both cases, using a steel base plate having 0.30% carbon, with a type 308L stainless steel wrought strip electrode, the carbon content in the single layer overlay was 0.049%. Using a sintered type 308L stainless powder metallurgy strip electrode with air in its pores, the carbon in the single layer overlay was 0.013%, which greatly adds to the corrosion resistance of the overlay.

Another expedient has been successfully used in the experiments to lower the carbon pickup by the overlay from a steel base plate having carbon of the order of 0.20% or higher. When overlaying with a corrosion resistant alloy such as type 304 stainless steel, it is important to keep the carbon level to 0.045% as a maximum. Many previous overlaying techniques obtained such a high carbon build-up in the overlay layer that it was necessary to deposit two overlay layers in order to get a low enough carbon content in the surface layer to resist corrosion. This doubles the cost of fabrication.

An alternate procedure to the inclusion of oxidizing gas such as air in the pores of the barrier strip is to include from 2 to 5% by weight of an oxide of the class consisting of an iron oxide, a chromium oxide or a nickel oxide in the powder metal barrier strip or in the powder metal electrode, or both. This definitely lowers the carbon pickup of the overlay by a reaction in which the oxide reacts with carbon to form carbon monoxide and liberate the corresponding metal. The preferred oxide is red iron or ferric oxide in a percentage of 2 to 5% by weight.

Very surprisingly, the present inventor has found that carbon pickup can be reduced markedly by running the "stickout" red hot. It will be evident that the contact shoes which engage the strip electrode are back of (above) the forward end at which the submerged arc is located, and this distance of the electrode protruding beyond the contact shoes is known as the "stickout." In usual practice in overlay submerged arc welding the "stickout" is about 1½ inches, but for the present purpose it is desirable to extend the "stickout" even to as much as 4¼ inches. The electrical characteristics can then be adjusted so that the $RI^2$ resistance heating of the "stickout" maintains the "stickout" red hot. It is very easy to do this with a powder metal electrode because the porosity which can be held to a range of 5 to 45% by volume, and preferably 10 to 30% by volume, makes the electrode strip a relatively poor conductor which gives high $RI^2$ heating even with moderate currents. Even with a solid wrought strip electrode, however, the "stickout" can be run red hot by retracting or raising the contact shoes so as to maintain the "stickout" at a temperature of about 1800° F. In the present invention, the "stickout" penetrates to a level beneath the top of the submerged arc flux and as the electrode is advancing in the direction of its thickness (at right angles to its width) it will of course be evident that it must push flux ahead of it as the welding machine advances. With a red hot "stickout" this would not be possible because the very soft and easily bent "stickout" portion of the electrode would deflect rearwardly, pressed backward by the flux.

To prevent this, as shown later herein, I provide a guide or support behind the "stickout" preferably just below the level of the top of the flux burden. This can be made of a non-conducting ceramic rod such as fused alumina which engages right behind the strip, or if desired behind and at the sides, or in some cases it may surround the strip. Thus in a suitable case where the "stickout" is buried ½ inch beneath the top of a flux burden two inches thick, the bottom of the guide can to advantage be about 1½ inches above the work surface or about ½ inch below the top of the flux burden. This arrangement works well with a 4¼ inch "stickout."

It will be evident that there is a close relation between hot "stickout," running at a temperature of the order of 1000° F., and the inclusion in a powder metallurgy strip electrode of longitudinal nonmetallic or organic plastic fibers such as nylon, polytetrafluoroethylene, copolymer of polyfluoroethylene with 5 to 35 % by weight of hexafluoropropylene or monochlorotrifluoroethylene. By using this hot "stickout," it is assured that the plastic will distill off without leaving any appreciable carbon residue which would increase the carbon content of the weld pool and of the overlay, thus behaving quite differently from other organic compounds which would break down and deposit carbon rather than distilling off under such conditions. I find that the strip is strengthened and held together by the longitudinally extending plastic fibers (which may be threads, monofilament, or yarn) to a point close enough above the weld pool so that the strip electrode does not disintegrate, and thus is capable of remaining strong as long as the strength is needed. Thus, the organic plastic has the remarkable property in this connection of holding the strip electrode together notwithstanding that it is green or unsintered, until the strength is no longer needed, and then distilling without leaving any objectionable deposit such as carbon. If, however, the strip electrode containing such plastic fibers were employed in welding with cold "stickout," there would be danger that plastic particles would be deposited in the weld pool, in which case carbon buildup and porosity would be much more likely to occur.

EXAMPLE 1

Using this feature of the invention, very effective welding can be obtained at relatively low currents, for example, 900 amperes at 30 volts direct current straight polarity, with a progression of 10 inches per minute. This has given a deposition of 80 pounds per arc hour with markedly less dilution from an AISI 1050 steel base plate, depositing an overay of type 309 stainless steel.

The following table shows in percent by weight that a markedly lower carbon pickup and lower alloy dilution was obtained where all other conditions were the same using the hot "stickout" with the support behind the "stickout" as described above:

|  | "Stickout" 1½ in. | "Stickout" 4¼ in. |
| --- | --- | --- |
| C | 0.141 | .088 |
| Cr | 20.41 | 22.23 |
| Ni | 9.55 | 10.84 |

The base plate had a carbon content of 0.50%.

FIGURE 1 shows an overlay welding device of the invention which may, for example, conform to my U.S. Patent 3,271,554, granted Sept. 6, 1966, for Overlay Welding, incorporated herein by reference.

FIGURES 1 and 2 show a backing plate 20 on which an overlay 21 is being deposited, using a powder metal strip electrode 22, taking the strip from a coil 23, over suitable guide rollers 24, advancing it in the direction of arrow 28 by a motorized electrode feed device 25 and introducing welding current into it by contacts 26. The plate 20, as well known, is electrically grounded, creating an arc at 27.

Powder metal barrier strip 30 comes from a coil 31 and is deposited on the backing plate 20 ahead of the arc as shown in FIGURES 1 and 2, so as to create a weld pool 32 by melting all of the metal from the electrode, all of the metal from the barrier strip and a small amount of surface metal from the backing plate 20. Powdered flux 33' is supplied through suitable flux feeders 33 and 33⁴ ahead of and behind the arc. The arc moves forward by advance of the electrode and is self-oscillating. The arc moves over the barrier strip and with the flux feeders in the direction of the arrow 34. There is a cover of molten slag 33² (FIGURE 8) forming on the weld pool 32 and this solidifies to produce a slag deposit 33³ on top of the overlay 21.

In the preferred embodiment, a green or unsintered powder metallurgy barrier strip is produced as shown in FIGURE 3, feeding suitable fibers or in this case suitable fine wires 35 from a convenient source such as coils through an optional guide 36 into a hopper 37 into which metal powder or powders 38 has been fed, the metal powder suitably being blended to include the desired composition, for example alloying ingredients, iron where appropriate, and deoxidizer. Together with the powder 38, metallic fibers or chopped-up wires may be used.

The metal powder discharges from the bottom of the hopper at 40 surrounding the wires and passes between the bight of rolls 41 which are driven in the direction shown by the arrows 42. There are suitable edge guides, not shown for the purpose of illustrating better the creation of the barrier strip 30, which has the wires 35 extending longitudinally and embedded therein.

Where the overlay is of a chromium and nickel composition or a nickel composition, the wires 35 are preferably of a suitable grade of stainless steel.

Of course, it will be evident that various compositions of powder may be used for making up the powder metal components of the barrier and/or electrode strip, a suitable example being as follows in percentage by weight:

|  | Percent |
| --- | --- |
| Ferrochrome (70% chromium) | 34 |
| Nickel | 10 |
| Manganese | 2 |
| Aluminum | 1 |
| Iron | Balance |

In this case the wires can conveniently be of type 309, 304 or 308 stainless steel.

The barrier strip 30 produced in FIGURE 3 is shown more clearly in FIGURE 4. This is a highly flexible strip which is nevertheless quite adequately strong. When it unrolls it does not have to be straightened and will conform to any curvature of discontinuity of the backing plate.

It offers the advantages of a high degree of flexibility, sufficient strength and adaptability in composition since it can be produced as it is used or shortly before it is used. It contains the deoxidizer required to make the slag part readily, and if the open porosity is regulated in the range of 5 to 45% by volume, preferably 10 to 30% by volume, and also the barrier strip is not surrounded by an inert gas before it enters the weld pool, it will aid in elimination of carbon by carrying air into the bottom of the weld pool. Since this strip obtains its strength without the need to be sintered, there is a potential saving of 30% over the cost of conventional sintered strip.

FIGURE 5 illustrates a modified form of barrier strip 30' which instead of having continuous wires extending therethrough has a series of fibers 43 which are introduced in the hopper 37 and which, if desired, can be arranged longitudinally in the green powder metal barrier strip. These fibers can be of any suitable metal such as nickel or iron.

In FIGURES 8 and 9 I show a "stickout" 44 which is running red hot, extending below the top 45 of the flux and plowing through the flux as the welding machine advances in the direction of the arrow 34. A bracket 47 from the machine extends down close to the work behind the electrode and has an insulating refractory support 48 which engages the wide part of the strip in the direction in which the strip would tend to bend and at a level suitably below the top of the flux burden.

A strip electrode was made according to the technique of FIGURES 3 and 4, introducing longitudinally extending monofilaments or cords of nylon into the strip instead of wires. The strip had a thickness of 0.040 inch and a width of 1½ inches, the four nylon monofilaments were of a diameter of 0.013 inch and the green or unsintered strip electrode coiled into a standard coil having a 16 inch internal diameter. Overlay welding was carried on to a low carbon steel backing plate using this strip electrode, the welding conditions being 750 amperes, 30 volts DC straight polarity, at a speed of progression of 6 inches per minute. The hot "stickout" was used maintaining the "stickout" at a red temperature of the order of 1000° F. The stainless steel composition of the character of Example 1 was free from porosity and dense, and had a thickness of about ⅜ inch. The nylon vaporized before it entered the weld, distilling off without depositing carbon. The flux used was the neutral flux referred to in the table above.

Similar results can be obtained by employing polyfluorocarbon fibers in the powder metallurgy electrode strip, and running it with hot "stickout" so as to distill off the plastic before it enters the weld pool and the overlay deposit.

It will be evident that the invention can be applied as a means of improving overlay welding of any one of a wide variety of alloys such as chromium-nickel alloys, nickel alloys, chromium-nickel-iron alloys, nickel-iron alloys, copper base alloys, cobalt base hard-surfacing alloys, and numerous other ferrous and non-ferrous overlay alloys on backings either of ferrous or of non-ferrous alloys, the backings preferably being carbon steel, low alloy steel, or high alloy steel. The invention is applicable also for overlaying the insides or outsides of cylinders and pressure vessels which have a substantial amount of curvature.

EXAMPLE 2

In this case the barrier strip had the following composition by weight, the barrier strip being green:

| | Percent |
|---|---|
| Chromium | 25 |
| Nickel | 14 |
| Manganese | 0.5–3 |
| Aluminum | 0.5–1.5 |
| Iron | Balance |

The barrier strip contained four 0.020 inch diameter longitudinal type 308L stainless steel wires.

The electrode was type 308L stainless sintered powder metallurgy strip, 0.030 x 1½ inches.

The barrier strip was flexible and lay flat on the backing plate.

EXAMPLE 3

The invention was demonstrated by welding with a sintered powder-metallurgy electrode strip containing 1% by weight of aluminum particles as a deoxidizer, with no barrier strip. The submerging flux was that referred to previously in respect to FIGURES 6 and 7. The composition of the strip electrode was that of Example 3. A fully adhering one-layer overlay was obtained free from porosity and the slag was self-removing, leaving a clean silvery surface as shown in FIGURE 7. Although the carbon backing steel was of AISI 1020 steel, the analysis of the overlay was as follows in percentage by weight:

| | |
|---|---|
| Carbon | 0.047 |
| Chromium | 19.51 |
| Nickel | 9.60 |
| Iron | Balance |

The submerging flux composition was set forth in detail above.

The electrode had a width of 1½ inches and a thickness of 0.030 inch. The current was 950 to 1100 amperes at 30 volts, DC straight polarity constant potential. The speed of progression was 10 inches per minute.

EXAMPLE 4

In this case the composition of the barrier strip was as follows in percentage by weight:

| | |
|---|---|
| Ferrochrome (70% chromium) | 34 |
| Nickel | 13 |
| Manganese | 1.7 |
| Aluminum | 1 |
| Iron | 50.3 |

The same operating conditions were used otherwise and very good slag removal was obtained. The composition of the overlay was as follows in percent by weight:

| | |
|---|---|
| Chromium | 19 |
| Nickel | 9.5 |
| Carbon | 0.045 |
| Manganese | 0.90 |
| Silicon | 0.85 |
| Iron | Balance |

Longitudinal sections ⅜ inch wide cut from this stainless steel overlay were sound, revealing complete fusion with the base metal and sufficient ductility at the bond line to permit a 180° bend around a 1½ inch diameter mandrel at room temperature.

EXAMPLE 5

A hard surface deposit can be made with powder metallurgy hard surfacing strip with or without a similar barrier strip. A suitable composition for the hard surfacing powder metal electrode and barrier strip is capable of depositing an alloy of 1.39% carbon, 1.65% manganese, 15.7% chromium and 7.12% molybdenum. The welding conditions are 1150 amperes at 30 volts and 9 inches per minute direct current straight polarity under a neutral submerged arc flux. The composition of the electrode desirably contains 3% of high carbon ferromanganese, 20% of molybdenum and 70% of high carbon ferrochrome. The balance of the deposit composition is iron. The electrode and/or the barrier strip are effectively compacted by rolling at 40 tons per square inch to a thickness of 0.030 inch to 0.060 inch and a width of 2 inches for the electrode strip, and to a thickness of 0.050 to 0.090 inch and a width of 1½ inches for the barrier strip. The electrode should be sintered in hydrogen at about 2500° F. but the barrier strip can be used green according to the present invention by incorporating wires or fibers as previously described. This will save about 30% of the cost of the barrier strip.

EXAMPLE 6

The procedure of Example 5 was carried out with a powder metallurgy hard-surfacing strip electrode which had a composition as follows:

| | Percent |
|---|---|
| High carbon ferrochrome (60% chromium, 10% carbon, balance iron) | 50 |
| Iron powder | 49 |
| Aluminum powder | 1 |

This made on a mild steel base plate a hard-surfacing deposit having the following composition in percent by weight:

| | |
|---|---|
| Chromium | 25.6 |
| Carbon | 2.79 |
| Iron | Balance |

The hardness of the overlay was Rockwell C59.

EXAMPLE 7

The procedure of Example 1 is followed except that longitudinal nickel fibers are used instead of stainless steel wires, due allowance being made for the difference in composition. The results obtained are similar to those set forth in Example 1.

It will thus be evident that there are advantages of the invention in employing a green barrier strip which has the strength imparted by longitudinally extending metallic fibers in employing an open porous barrier strip and in incorporating deoxidizer.

All percentages except porosity are percentages by weight. Porosity is expressed in percentage by volume.

When reference is made to fibers which extend in a powder metallurgy strip, it will be understood that this is intended to include fibers which may be short and also fibers which may be of indefinite length like wires, threads, yarn, or the like. When the fibers are of a non-metallic material such as plastic, they might in certain cases be more appropriately described as filaments, threads, slub, roving, yarn, or strands.

The principles of the invention can be applied to various types of welding, where the objective may be overlaying or arc cladding, joining, remelting, depositing ingots or billets, or otherwise. The particular method in many cases will be the submerged arc welding method, but it will be evident that the principles of the invention may be applied to open arc which has the advantage of high visibility, to gas-shielded or protected open arc, to Mig welding, Tig welding, and electrogas welding.

In view of my invention and disclosure, variations and modifications to meet individual whim or particular need will doubtless become evident to others skilled in the art to obtain all or part of the benefits of my invention without copying the apparatus and composition shown, and I, therefore, claim all such insofar as they fall within the reasonable spirit and scope of my claims.

Having thus described my invention what I claim as new and desire to secure by Letters Patent is:

1. A process of electric arc overlay welding on a metallic backing, which comprises laying down against the backing a green unsintered barrier strip of compacted metal powder having metal fibers extending longitudinally therein, advancing a metallic electrode toward the barrier strip, maintaining an electric arc between the electrode and the barrier strip to form a weld pool by melting metal from the electrode, metal from the barrier strip and metal from the backing, and progressing the electrode and the pool longitudinally of the barrier strip.

2. A process of claim 1, in which the barrier strip includes at least one deoxidizer of the following class in the following percentage by weight:

| | |
|---|---|
| Aluminum | 0.50–5.0 |
| Manganese | 0.50–6.0 |
| Calcium | 0.05–2.0 |
| Silicon | 0.25–2.0 |
| Titanium | 0.25–2.0 |
| Magnesium | 0.25–3.0 |
| Lanthanum | 0.10–0.6 |
| Cerium | 0.10–0.6 |
| Boron | 0.05–0.2 |
| Lithium | 0.20–0.5 | which comprises feeding flux onto the pool to form slag, allowing the pool and the slag to solidify, and parting the slag from the overlay weld thus formed due to the presence of the deoxidizer.

3. A process of claim 2, in which the deoxidizer is present as discrete particles.

4. A process of claim 2, in which the backing is steel and in which the barrier strip has an open porosity in the range of 5 to 45% by volume, which further comprises introducing into the weld pool oxidizing gas occupying said porosity and thereby reducing the carbon content of the overlay.

5. In mechanism for electric arc overlay welding on a metallic backing, green unsintered barrier strip of compacted metal powder having longitudinal metallic fibers therein resting on the backing, an elertrode in spaced relation from the barrier strip and aligned therewith, means for maintaining an electric arc between the electrode and the barrier strip to form a weld pool by melting metal from the electrode, metal from the barrier strip and metal from the backing, and means for progressing the electrode and the pool longitudinally of the barrier strip.

6. Mechanism of claim 5, in which the barrier strip includes at least one deoxidizer of the following class in the following percentage by weight:

| | |
|---|---|
| Aluminum | 0.50–5.0 |
| Manganese | 0.05–6.0 |
| Calcium | 0.05–2.0 |
| Silicon | 0.25–2.0 |
| Titanium | 0.25–2.0 |
| Magnesium | 0.25–3.0 |
| Lanthanum | 0.10–0.6 |
| Cerium | 0.05–0.2 |
| Boron | 0.05–0.2 |
| Lithium | 0.20–0.5 | which comprises feeding flux onto the pool to form slag, allowing the pool and the slag to solidify, and parting the slag from the overlay weld thus formed, due to the presence of the deoxidizer.

7. Mechanism of claim 5 in which the barrier strip has open porosity in the range of 5 to 45% by volume.

References Cited

UNITED STATES PATENTS

| | | | |
|---|---|---|---|
| 1,898,068 | 12/1933 | Thompson et al. | 219—146 |
| 2,049,368 | 7/1936 | Gilbert | 219—146 |
| 2,107,434 | 2/1938 | Wilson | 148—24 X |
| 3,184,368 | 5/1965 | Juras | 156—62.2 X |
| 3,271,554 | 9/1966 | Johnson | 219—76 |
| 3,305,408 | 2/1967 | Dick | 148—24 X |

JOSEPH V. TRUHE, Primary Examiner

C. L. ALBRITTON, Assistant Examiner

U.S. Cl. X.R.

148—22, 23, 24; 219—73, 137, 146